United States Patent
Yang et al.

[11] Patent Number: 6,155,742
[45] Date of Patent: Dec. 5, 2000

[54] COUPLING MECHANISM FOR INTERCONNECTING A ROTATABLE CONNECTING END OF A SUPPORT ON A BROACHING MACHINE AND A BIT HOLDER

[75] Inventors: Ching-Yi Yang; Wen-Chou Chang; Te-Ming Kuo; Ping-Shun Chang; Chia-Ping Ho; Ming-Yueh Ding, all of Taichung, Taiwan

[73] Assignee: Precision Mechinery Research & Development Center, Taichung, Taiwan

[21] Appl. No.: 09/271,187

[22] Filed: Mar. 17, 1999

[51] Int. Cl.[7] ............................................. F16B 7/00
[52] U.S. Cl. ........................... 403/337; 403/373; 464/137
[58] Field of Search .................................... 403/335, 336, 403/337, 338, 299, 373; 464/137; 409/243, 287, 262, 268

[56] References Cited

U.S. PATENT DOCUMENTS

| | | | |
|---|---|---|---|
| 759,726 | 5/1904 | Maxim | 464/137 |
| 2,565,606 | 8/1951 | Guy | 403/335 X |
| 4,708,692 | 11/1987 | Weiss | 464/137 X |
| 5,352,076 | 10/1994 | Garden | 409/287 |

FOREIGN PATENT DOCUMENTS

| | | | |
|---|---|---|---|
| 2335097 | 1/1974 | Germany | 403/337 |
| 1656219 | 6/1991 | U.S.S.R. | 403/337 |
| 9046 | of 1885 | United Kingdom | 403/337 |
| 2094 | of 1888 | United Kingdom | 403/337 |

*Primary Examiner*—Harry C. Kim
*Attorney, Agent, or Firm*—Merchant & Gould P.C.

[57] ABSTRACT

A coupling mechanism interconnects a rotatable connecting end of a support on a broaching machine and a bit holder which includes a rotary hollow shaft and a mandrel received in the hollow shaft. The coupling mechanism includes a first coupling member that has a first disk part and a first neck part, and a second coupling member that has a second disk part and a second neck part. The first neck part is connected to the connecting end of the support. The first disk part has a plurality of posts projecting axially from the first disk part opposite to the first neck part. The second neck part extends into the hollow shaft for connection with the mandrel. The second disk part has slide holes which extend axially in the second disk part at locations radially outward of the second neck part so as to receive the posts. The second coupling member is guided by the posts and the slide holes for sliding axially relative to the first coupling member. Plural fastening holes extend through the first disk part and the posts. Plural fasteners are disposed in the fastening holes to engage the hollow shaft.

2 Claims, 4 Drawing Sheets

COUPLING MECHANISM FOR INTERCONNECTING A ROTATABLE CONNECTING END OF A SUPPORT ON A BROACHING MACHINE AND A BIT HOLDER

BACKGROUND OF THE INVENTION

1. Field of the Invention

This invention relates to a coupling mechanism, more particularly to a coupling mechanism for interconnecting a rotatable connecting end of a support on a broaching machine and a bit holder.

2. Description of the Related Art

FIGS. 1 and 2 show a conventional coupling mechanism for interconnecting a rotatable connecting end 151 of a support 15 and a bit holder on a broaching machine. The bit holder includes a rotary hollow shaft 10 that is rotatable by means of a motor 11, and a mandrel 13 that is rotatable with the hollow shaft 10 and that is slidable axially in a central axial hole 101 of the hollow shaft 10. The conventional coupling mechanism includes a first coupling member 20 and a second coupling member 30. The first coupling member 20 has a first disk part 22 and a neck part 21 having a cross-section smaller than that of the first disk part 22. The neck part 21 is adapted to be connected to the connecting end 151 of the support 15. The first disk part 21 is formed with a bore 23 and an internal thread 231 that engages the connecting end 151 of the support 15. The first disk part 22 has a plurality of slide holes 221 adjacent to the neck part 21, and a plurality of fastening holes 222 adjacent to the periphery of the first disk part 22. A plurality of first screw fasteners 24 extend through the fastening holes 222 and engage threaded holes 102 formed in the top face of the hollow shaft 10 in order to fix the first coupling member 20 on the hollow shaft 10. The second coupling member 30 has a second disk member 33 and a plurality of posts 32 projecting axially and upwardly from the second disk member 33. The second disk member 33 is slidable axially and is rotatable in the central axial hole 101 of the hollow shaft 10, and has therein an internal threaded hole 331 for engaging threadedly the mandrel 13. The posts 32 extend through the slide holes 221 and are connected to a ring 34 by second screw fasteners 35. The ring 34 is sleeved on the neck part 21. With the construction as such, the second coupling member 30 is slidable axially relative to the first coupling member 20 and is rotatable with the same. A hydraulic driving device 14 is provided adjacent to the support 15 for pushing the posts 32 of the second coupling member 30 and the mandrel 13 downwardly. Accordingly, the lower end 16 of the mandrel 13 can actuate a chuck 17 mounted on the lower end of the hollow shaft 10 so as to release a bit (not shown) from the chuck 17.

A disadvantage of such a conventional coupling mechanism resides in that when a hollow shaft 10 of a relatively small diameter is to be connected to the first coupling member 20, the diameter of the first disk member 22 is relatively small while the diameters of the neck part 21 and the connecting end 151 of the support 15 are maintained constant. Therefore, the structural strength of the first disk member 22 in which the slide holes 221 and the fastening holes 222 are formed is very weak.

SUMMARY OF THE INVENTION

The object of the present invention is to provide a coupling mechanism that has a stronger structural strength as compared to the aforementioned coupling mechanism when the coupling mechanism is used to engage a rotary hollow shaft of a relatively small diameter.

According to the present invention, the coupling mechanism is adapted for interconnecting a rotatable connecting end of a support on a broaching machine and a bit holder which includes a rotary hollow shaft having therein a mandrel that is rotatable with the rotary hollow shaft and that is slidable axially in the rotary hollow shaft. The coupling mechanism comprises a first coupling member and a second coupling member. The first coupling member includes a first disk part and a first neck part with a cross-section smaller than that of the first disk part. The first neck part is adapted to be connected to the connecting end of the support. The first disk part has a plurality of posts projecting axially from the first disk part opposite to the first neck part. The second coupling member includes a second disk part and a second neck part with a cross-section smaller than that of the second disk part. The second neck part is adapted to extend into the hollow shaft and is adapted to be connected to the mandrel. The second disk part has slide holes which extend axially in the second disk part at locations radially outward of the second neck part so as to receive the posts. The second coupling member is guided by the posts and the slide holes for sliding axially relative to the first coupling member. A plurality of fastening holes extend through the first disk part and the posts. A plurality of fasteners are disposed in the fastening holes and are adapted to extend into and engage the hollow shaft.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
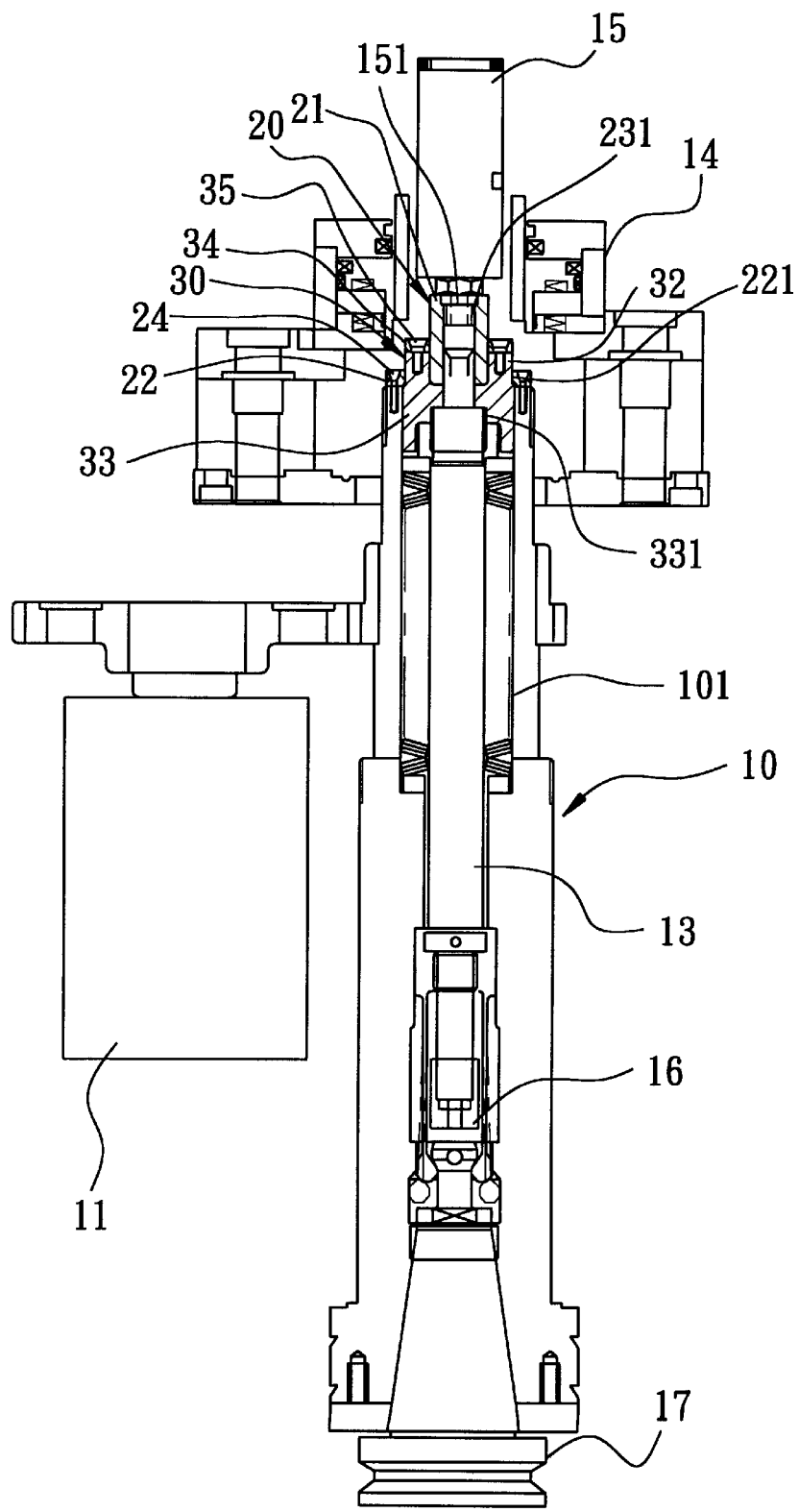
FIG. 1 is a schematic view illustrating how a conventional coupling mechanism is used to interconnect a connecting end of a support and a bit holder of a broaching machine.
Figure 2:
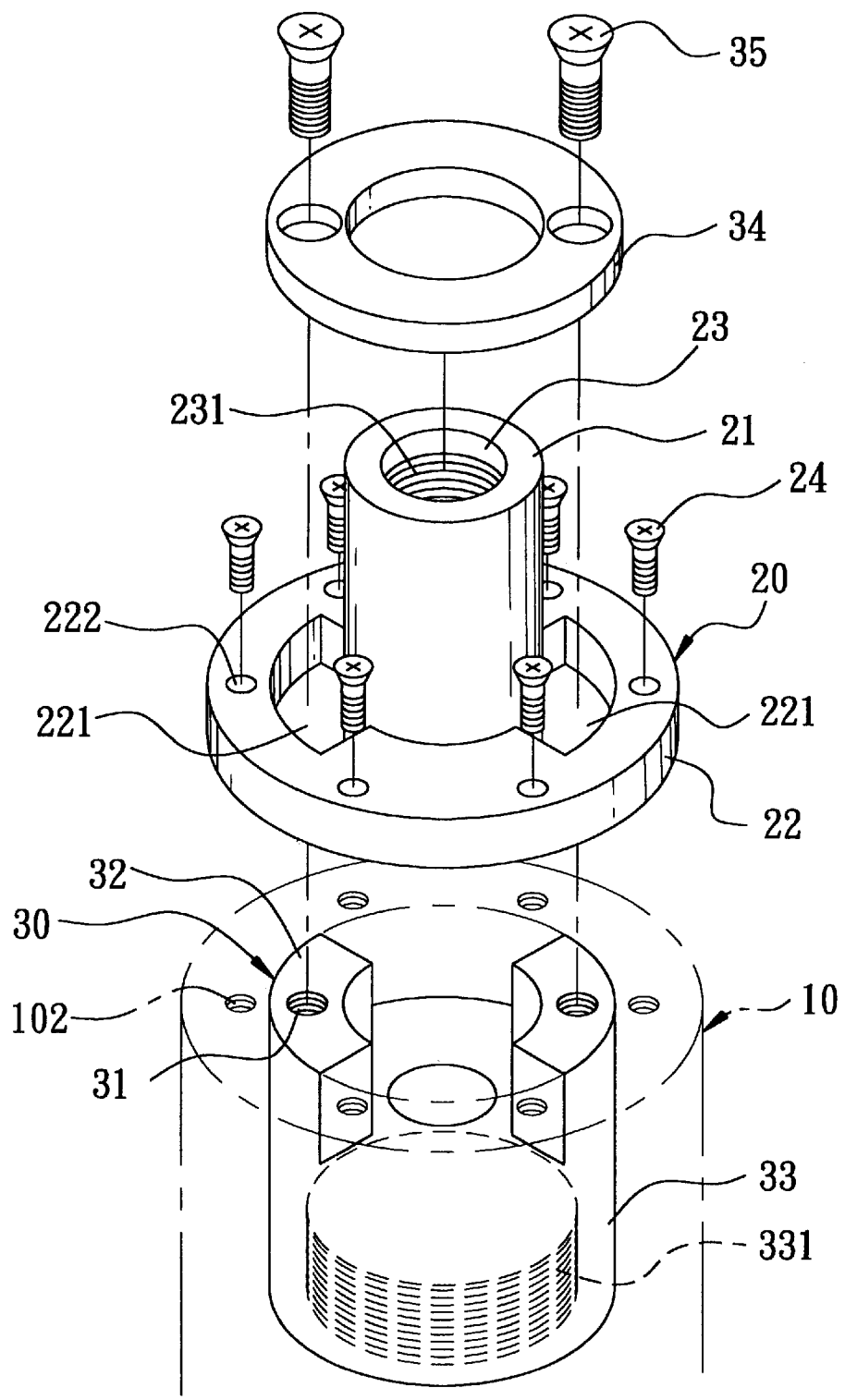
FIG. 2 is a perspective exploded view of the conventional coupling mechanism.
Figure 3:
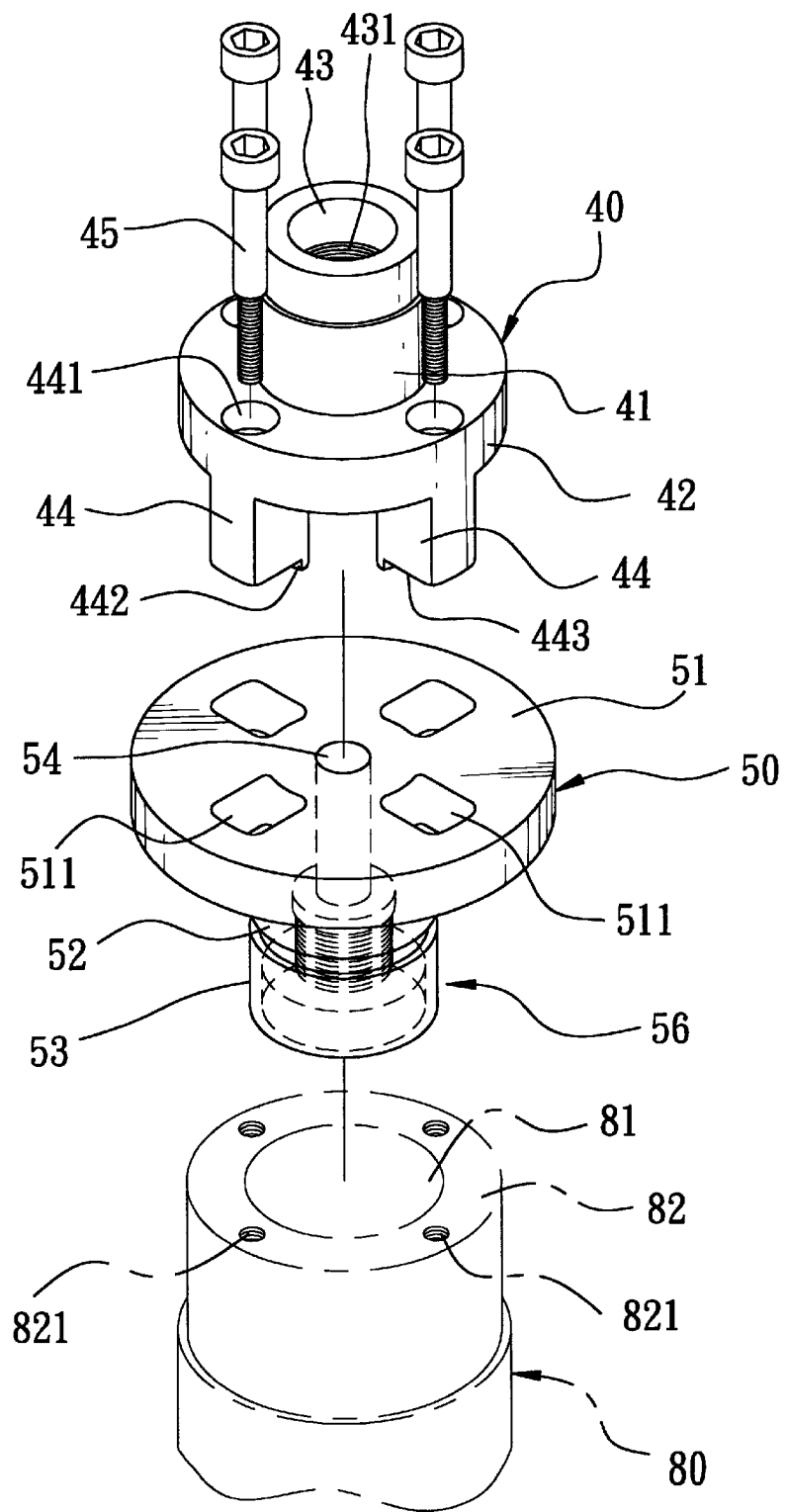
FIG. 3 is an exploded view of a preferred embodiment of a coupling mechanism according to the present invention.
Figure 4:
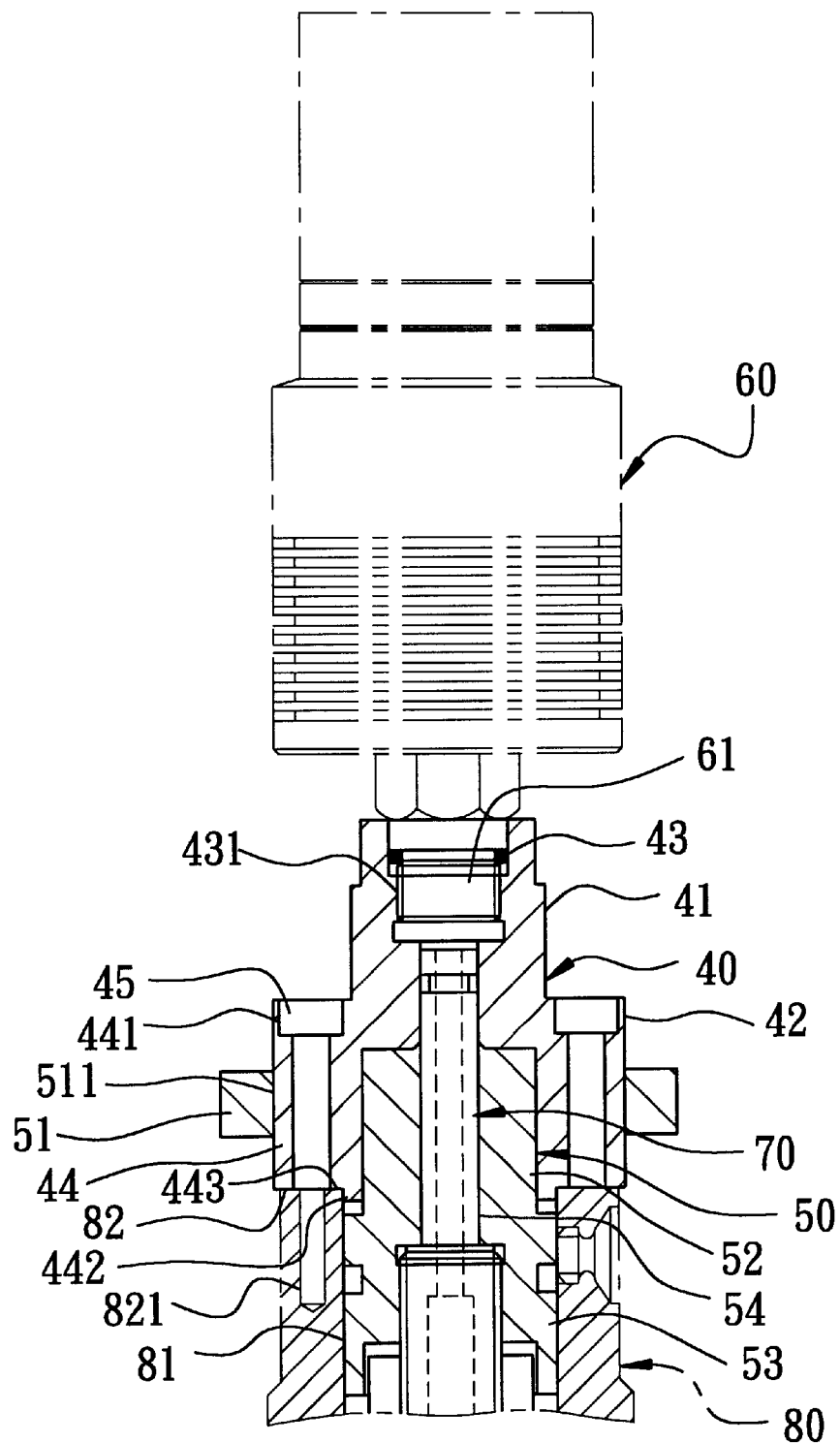
FIG. 4 is a partly sectional schematic view illustrating the preferred embodiment of the coupling mechanism that interconnects a rotatable connecting end of a support and abit holder of a broaching machine.

Referring to FIGS. 3 and 4, a preferred embodiment of a coupling mechanism according to the present invention is shown to comprise a first coupling member 40 and a second coupling member 50. The coupling mechanism is adapted to interconnect a rotatable threaded connecting end 61 of a support 60 and a bit holder that includes a rotary hollow shaft 80 and a mandrel 70. The mandrel 70 is rotatable with the hollow shaft 80 and is slidable axially in the hollow shaft 80, as will be described in detail hereinbelow.

The first coupling member 40 includes a first disk part 42, a first neck part 41 with a cross-section smaller than that of the first disk part 42, and an axial hole 43 extending through the first disk part 42 and the first neck part 41. The first neck part 41 is formed with an internal thread 431 that engages threadedly the threaded connecting end 61 of the support 60. The first disk part 42 has a plurality of posts 44 projecting axially from the first disk part 42 opposite to the first neck part 41. Each of the posts 44 has a radially extending end face 443 adapted to abut against an end 82 of the hollow shaft 80. The end face 443 of each of the posts 44 is stepped to form an axially extending positioning tab 442 that projects into the central axial hole 81 of the hollow shaft 80. The first coupling member 40 has a plurality of fastening holes 441 that extend through the first disk part 42 and the posts 44.

The second coupling member 50 includes a second disk part 51 and a second neck part 56 having a cross-section smaller than that of the second disk part 51. The second neck part 56 extends into the central axial hole 81 of the hollow shaft 80 for connection with the mandrel 70. The mandrel 70 extends through the central axial hole 81, an axial through bore 54 formed in the second coupling member 50, and the axial hole 43 of the first coupling member 40. The second disk part 51 has slide holes 511 which extend axially in the second disk part 51 at locations radially outward of the second neck part 56 so as to receive the posts 44. The second coupling member 50 is guided by the posts 44 and the slide holes 511 for sliding axially relative to the first coupling member 40. The second neck part 56 is stepped to form first and second sections 52, 53. The first section 52 is disposed between the second disk part 51 and the second section 53, and has a cross-section smaller than that of the second section 53. The first section 52 is surrounded by the posts 44. The second section 53 is received in the central axial hole 81 of the hollow shaft 80. A plurality of screw fasteners 45 extend through the fastening holes 441 and engage threadedly threaded holes 821 formed in the end 82 of the hollow shaft 80 to fix the first coupling member 40 on the hollow shaft 80.

With the construction as such, when the hollow shaft 80 is rotated by a motor (not shown), the first coupling member 40 is driven to rotate the rotatable connecting end 61 of the support 60 and the second coupling member 50. As such, the mandrel 70 can rotate.

The advantages of the coupling mechanism of the present invention are as follows:

1. Since the slide holes 511 through which the posts 44 extend and the fastening holes 441 through which the screw fasteners 45 extend are formed respectively in the second coupling member 50 and the first coupling member 40, the diameter of the first disk part 42 can be made smaller than that of the first disk part of the aforementioned conventional coupling mechanism so as to match the hollow shaft 80 of a relatively small diameter. Furthermore, the structural strength of the first coupling member 40 that is fixed on the hollow shaft 80 can be maintained at a desired level.

2. No ring of the aforementioned conventional coupling mechanism is required. The number of the components of the coupling mechanism of the present invention is less than that of the aforementioned conventional coupling mechanism. Therefore, the coupling mechanism of the present invention is easier to manufacture and assemble.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A coupling mechanism for interconnecting a rotatable connecting end of a support on a broaching machine and a bit holder which includes a rotary hollow shaft having therein a mandrel that is rotatable with the rotary hollow shaft and that is slideable axially in the rotary hollow shaft, said coupling mechanism comprising:

a first coupling member including a first disk part and a first neck part with a cross-section smaller than that of said first disk part, said first neck part being adapted to be connected to the connecting end of the support, said first disk part having a plurality of posts projecting axially from said first disk part opposite to said first neck part;

a second coupling member including a second disk part and a second neck part with a cross-section smaller than that of said second disk part, said second neck part is stepped to form first and second sections, said first section being disposed between said second disk part and said second section and having a cross-section smaller than that of said second section, said second neck part being adapted to extend into said hollow shaft and being adapted to be connected to said mandrel, said second disk part having slide holes which extend axially in said second disk part at locations radially outward of said second neck part so as to receive said posts, said second coupling member being guided by said posts and said slide holes for sliding axially relative to said first coupling member;

a plurality of fastening holes extending through said first disk part and said posts; and a plurality of fasteners disposed in said fastening holes and adapted to extend into the hollow shaft.

2. A coupling mechanism for interconnecting a rotatable connecting end of a support on a broaching machine and a bit holder which includes a rotary hollow shaft having therein a mandrel that is rotatable with the rotary hollow shaft and that is slideable axially in the rotary hollow shaft, said coupling mechanism comprising:

a first coupling member including a first disk part and a first neck part with a cross-section smaller than that of said first disk part, said first neck part being adapted to be connected to the connecting end of the support, said first disk part having a plurality of posts projecting axially from said first disk part opposite to said first neck part, wherein each of said posts has a radially extending end face adapted to abut against an end of the hollow shaft of the bit holder, said end face of each of said posts being stepped to form an axially extending positioning tab adapted to project into the hollow shaft;

a second coupling member including a second disk part and a second neck part with a cross-section smaller than that of said second disk part, said second neck part being adapted to extend into said hollow shaft and being adapted to be connected to said mandrel, said second disk part having slide holes which extend axially in said second disk part at locations radially outward of said second neck part so as to receive said posts, said second coupling member being guided by said posts and said slide holes for sliding axially relative to said first coupling member;

a plurality of fastening holes extending through said first disk part and said posts; and a plurality of fasteners disposed in said fastening holes and adapted to extend into the hollow shaft.

* * * * *